United States Patent [19]

Arent

[11] 4,043,316

[45] Aug. 23, 1977

[54] MODULAR DIRECT SOLAR HEAT WINDOW UNIT

[76] Inventor: Asa S. Arent, 700 - 15th St., North, Humboldt, Iowa 50548

[21] Appl. No.: 664,182

[22] Filed: Mar. 5, 1976

[51] Int. Cl.² ................................................ F24J 3/02
[52] U.S. Cl. ...................................... 126/270; 52/207; 160/92; 237/1 A
[58] Field of Search ................. 126/270, 271; 52/207; 160/89, 90, 91, 92; 237/1 A

[56] References Cited

U.S. PATENT DOCUMENTS

| 246,626 | 9/1881 | Morse | 126/270 |
|---|---|---|---|
| 2,931,587 | 4/1960 | Thompson | 126/270 |
| 3,111,725 | 11/1963 | Brown | 52/207 |
| 3,946,721 | 3/1976 | Keyes et al. | 126/270 |

OTHER PUBLICATIONS

Solar Energy, vol. 17, pp. 159–165, Pergamon Press, 1975, printed in Great Britain, written by Nicholas Fuschillo.

*Primary Examiner*—William F. O'Dea
*Assistant Examiner*—Robert J. Charvat
*Attorney, Agent, or Firm*—Zarley, McKee, Thomte, Voorhees & Sease

[57] ABSTRACT

A modular direct solar heat window unit comprising a vertically disposed frame having a lower window unit at the lower end thereof and a pair of upper window units positioned above the lower window unit. A ventilating window unit is provided in the upper end of the frame. The lower window unit comprises a pair of horizontally spaced and vertically disposed window members with each of the upper window units comprising a pair of window members which are disposed at an angle to the horizontal. A first panel member is hingedly secured at its lower end about a horizontal axis to the frame at the lower end thereof and is movable from a closed position adjacent the lower window unit to an open position. In the closed position, the first panel member protects and insulates the lower window unit. In the open position, the reflective inner surface of the first panel member reflects the rays of the sun into the lower window unit which has a solar heat collector positioned inwardly thereof. The first panel member is adjustably positioned in various positions relative to the lower window unit. A second panel member is hingedly secured about a horizontal axis to the upper end of the frame and is movable from a closed position adjacent the upper window units to an open position. In the closed position, the second panel member protects and insulates the upper window units. The second panel member is adjustably positioned in various open positions to provide varying amounts of shade to the upper window units as required. The inner surface of the second panel member is also provided with a reflective surface to enable the second panel member to also reflect rays of the sun onto the lower window units when the second panel member is properly positioned.

13 Claims, 4 Drawing Figures

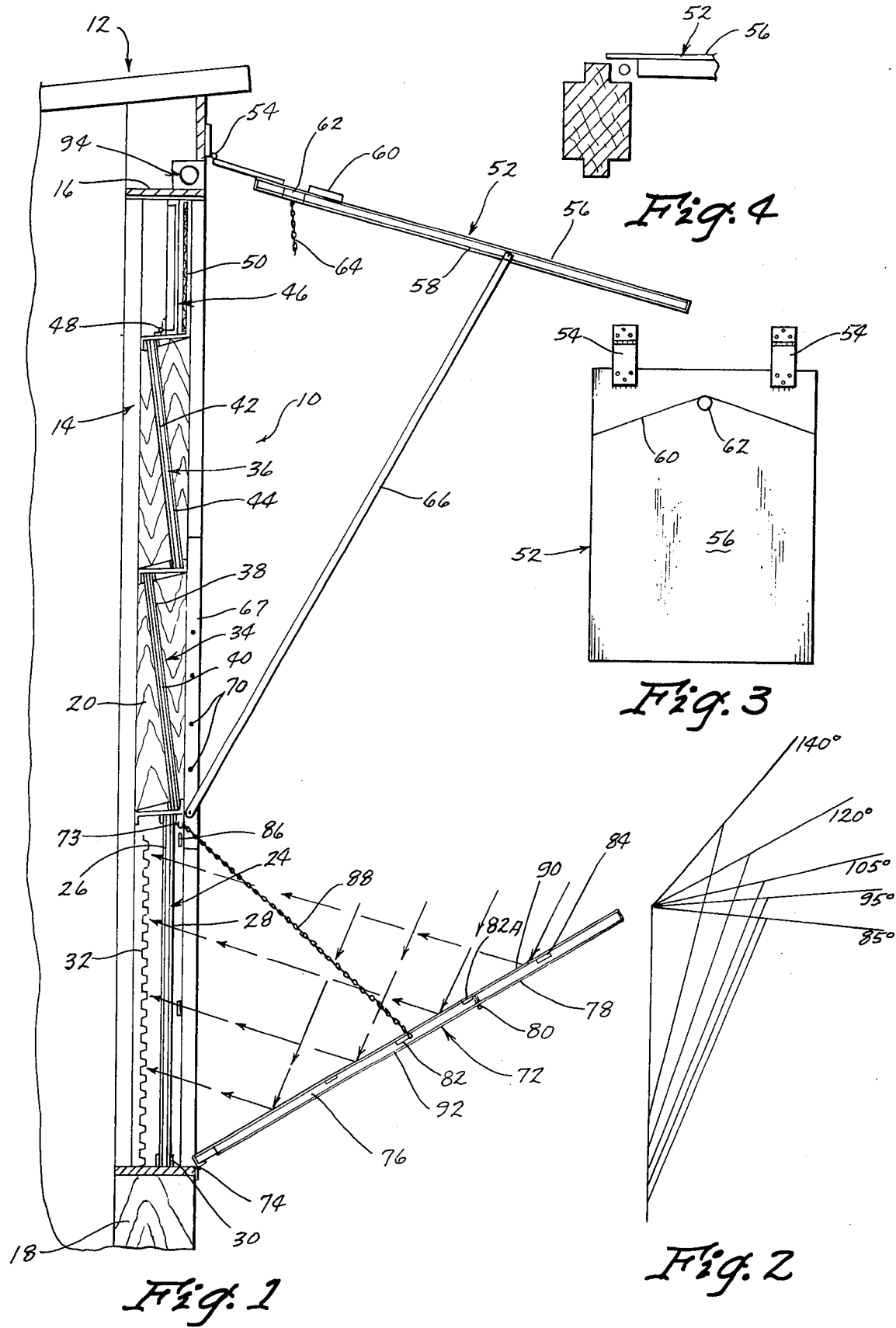

MODULAR DIRECT SOLAR HEAT WINDOW UNIT

BACKGROUND OF THE INVENTION

This invention relates to a solar window unit and more particularly to a modular direct solar heat window unit.

Many solar heat window units have been previously devised but to the best of applicant's knowledge, they all suffer serious disadvantages. In certain solar heat window units, it is impossible to see therethrough which drastically reduces the use thereof in homes, etc. Further, the conventional solar heat window units do not have any means for providing ventilation therethrough nor do the conventional solar heat window units have any means for providing desirable shade thereon during the summer months.

Additionally, the conventional solar window units do not lend themselves to installations in trailer homes, modular homes, existing homes, etc. due to the large and unwieldy design thereof.

Therefore, it is a principal object of the invention to provide an improved modular direct solar heat window unit.

Still further object of the invention is to provide a modular direct solar heat window unit which is provided with a ventilating window at the upper end thereof.

A still further object of the invention is to provide a modular direct solar heat window unit having desirable visibility characteristics.

A still further object of the invention is to provide a modular direct solar heat window unit which is provided with a pair of closable panel members to reflect rays of the sun onto the collector unit at times and to provide a protective means for the window unit at other times.

A still further object of the invention is to provide a modular direct solar heat window unit having a pair of panel members provided thereon which are easily adjustably positioned relative to the windows of the unit.

A still further object of the invention is to provide a modular direct solar heat window unit which includes means for preventing moisture or the like from accumulating thereon.

A still further object of the invention is to provide a modular direct solar heat window unit which is economical of manufacture, durable in use and refined in appearance.

BRIEF DESCRIPTION OF THE DRAWINGS

FIG. 1 is a vertical sectional view of the window unit of this invention:

FIG. 2 is a schematic illustrating the manner in which the rays of the sun are reflected onto the collector unit.

FIG. 3 is a plan view of the upper panel member; and

FIG. 4 is a sectional view of the side frame member of the window unit of this invention.

DESCRIPTION OF THE PREFERRED EMBODIMENT

The numeral 10 generally refers to the modular direct solar heat window unit of this invention while the numeral 12 refers to the building in which the unit 10 will be mounted such as a trailer home, modular home, existing building, etc. Unit 10 generally comprises a frame means 14 including upper frame member 16, lower frame member 18, and opposite side frame members 20 and 22 (not shown).

The numeral 24 refers to a lower window unit which comprises a pair of horizontally spaced and vertically disposed window members 26 and 28 which extend between the frame members 20 and 22. Members 26 and 28 are mounted in a frame means referred to by the reference numeral 30. The numeral 32 refers to a vertically disposed corrugated metal panel preferably having its outer surface painted black so as to comprise a solar heat collector means.

The numerals 34 and 36 refer to upper window units which are secured to and extend between the frame members 20 and 22. Window unit 34 is comprised of a pair of spaced-apart window members 38 and 40 which dwell in an inclined plane relative to vertical so that the upper ends thereof are spaced inwardly relative to the lower ends thereof. Likewise, unit 36 is comprised of spaced-apart window members 42 and 44 which extend between frame members 20 and 22 and which dwell in an inclined plane. A ventilating window 46 is provided at the upper end of the frame means 14 and is hingedly secured thereto at 48 to permit the window to be moved from the closed position of FIG. 1 to an open position to allow the circulation of air through the interior of the dwelling. Screen 50 is provided in the frame means outwardly of the ventilating window.

Panel member 52 is hingedly secured to the dwelling or frame means by means of a pair of hinges 54. Panel member 52 is provided with a protective outer surface 56 and a reflective inner surface 58. The outer surface 56 of panel member 52 is comprised of plywood, aluminum, etc. While the reflective inner surface may be comprised of a highly reflective material such as polished steel, aluminum, etc. The outer surface 56 of panel member 52 is provided with a V-shaped rain trough 60 extending upwardly therefrom which is adapted to direct moisture thereon towards the drain opening 62 when the panel member 52 has been pivotally moved upwardly greater than 90° from its closed position. A drip chain 64 extends downwardly through the opening 62 so that the water passing through the opening 62 will drip downwardly onto the ground without dripping onto the window units positioned therebelow. A pair of positioning arms 66 and 68 (not shown) are pivotally connected to opposite sides of the panel member 52 and are selectively pivotally adjusted to metal frame members 67 and 69 (not shown) respectively which are secured to frame members 20 and 22 respectively. Frame members 67 and 69 are provided with a plurality of vertically spaced openings 70 which are adapted to receive a pin or the like extending through the lower ends of the arms 66 and 68.

Panel member 72 is pivotally connected at its lower end to the dwelling or frame means 14 at 74. Panel member 72 is comprised of panel portions 76 and 78 hingedly secured together at 80 and yieldably maintained in the aligned position by magnets 82 and 82A. Panel portion 78 is also provided with a pair of magnets 84 at the opposite upper end thereof which are adapted to magnetically affix to the metal frame members 67 and 69 to maintain the panel member 72 in a closed position. Magnet means 82 is also adapted to magnetically affix to the magnet means 86 provided on the frame means to aid in maintaining the panel member 72 in a closed position. Chain means 88 extends between the panel member 72 and the frame means to permit the panel member 72 to be adjustably positioned in various positions of its angular displacement with respect to the lower window unit and the frame means by means of hook 73. The inner surface 90 of panel member 72 is comprised of a highly reflective material so that the rays of the sun striking the reflective surface will be directed through the lower window unit 24 onto the collector means 32. The outer surface 92 of panel member 72 is a protective surface comprised of plywood, metal, etc.

During the hot summer months, the panel member 72 would normally be in a closed position so that panel portion 76 substantially covers lower window unit 24. Ordinarily, the panel portion 78 would be pivoted relative to panel portion 76 so as to be positioned adjacent the outer surface thereof during those hot summer months so that the visibility of the occupants of the dwelling would not be impeded. During the hot summer months, the panel member 52 would be pivotally moved upwardly so as to provide shade for the window units 34 and 36. The inclined nature of the windows 34 and 36 permits the windows to permit heat to pass therethrough during the winter months while still permitting the occupants of the dwelling to see therethrough during the winter and summer months. The ventilating window 46 may be opened and closed as desired.

During the winter months, the panel member 52 would normally be pivotally moved upwardly beyond the positions seen in FIG. 1 so that the reflective inner surface 58 of panel member 52 would cause the rays of the sun striking the same to be reflected downwardly to the lower window unit 24. Various solar angles are depicted in FIG. 2. During the winter months, the panel member 72 would also be pivotally moved outwardly to an open position corresponding to the relative position of the sun so that the rays of the sun would be reflected by the reflective inner surface 90 through the lower window unit 24 onto the solar collector means 32. The upper extreme position of panel 52 also is adapted to permit direct access of sunlight to the upper windows. The angle of the panel member 72 will necessarily have to be varied depending upon the time of day, month, etc. so that maximum efficiency is achieved. It is also preferred that a heating coil 94 be provided adjacent the upper end of the panel member 52 to prevent the accumulation of ice or the like which would interfere with the operation of the panel member 52.

The solar collector 82 is a radiator to supply heat therefrom to the interior of the dwelling.

Thus it can be seen that a novel modular direct solar heat window unit has been provided which may be easily installed in trailer homes, modular homes, existing dwellings, or the like. It can also be seen that the modular direct solar heat window unit of this invention permits maximum utilizatio of solar energy during the winter months and permits maximum visibility for the occupants of the dwelling during the summer and winter months. The panel members 52 and 72 not only provide a means for reflecting the rays of the sun onto the collector means as desired but also provide a protective means for the window units when positioned in their closed position.

Thus it can be seen that the device of this invention accomplishes at least all of its stated objectives.

I claim:
1. In combination,
a building,
a modular direct solar heat window unit mounted in the side of the building,
said window unit comprising a vertically disposed frame means having upper and lower ends and spaced-apart sides,
a lower window unit at the lower end of said frame means,
at least one upper window unit mounted in said frame means above said lower window unit for visibility,
a first panel member hingedly secured at its lower end about a horizontal axis to said frame means at the lower end thereof and being movable from a closed position adjacent said lower window unit to an open position, said first panel member having a reflective inner surface,
first connection means for adjustably positioning said first panel member in various positions relative to said lower window unit whereby the rays of the sun striking said inner surface may be reflected onto said lower window unit,
and a second panel member operatively hingedly secured to the upper end of said frame means and being movable from a closed position adjacent said upper window unit to an open position, said second panel member protecting and insulating said upper window unit when in its closed position and providing shade for said upper window unit when in a partially open position, said second panel member permitting normal visibility through said upper window unit when in its open position,
second connection means for adjustably positioning said second panel member in various positions relative to said upper window unit,
and a solar heat collector means positioned inwardly of said lower window unit.

2. The combination of claim 1 wherein said lower window unit dwells in a vertical plane.

3. The combination of claim 2 wherein said lower window unit comprises a pair of horizontally spaced glass windows.

4. The combination of claim 3 wherein said solar heat collector means comprises a vertically disposed corrugated metal panel.

5. The combination of claim 1 wherein said upper window unit is disposed at an angle with respect to said frame means so that the upper end of said upper window unit is spaced inwardly of the lower end thereof.

6. The combination of claim 5 wherein a pair of vertically spaced upper window units are provided in said frame means.

7. The combination of claim 6 wherein each of said upper window units comprises a pair of spaced window panes.

8. The combination of claim 1 wherein said second panel member has inner and outer surfaces and top and bottom edges, said second panel member having a V-shaped moisture trough means on its outer surface adjacent the upper end thereof, said second panel member having an opening formed therein which communicates with said trough means whereby accumulated moisture on said outer surface of said second panel member will be directed to said opening when said second panel member has been opened greater than 90° relative to said frame means.

9. The combination of claim 8 wherein a drip chain means extends through said opening in said second panel member.

10. The combination of claim 1 wherein said lower window unit is provided with a magnet means thereof for maintaining said lower window unit in a closed position.

11. The combination of claim 1 wherein said lower window unit has a moisture drain opening formed therein adjacent the lower end thereof.

12. The combination of claim 1 wherein a ventilating window unit is provided in said frame means above said upper window unit.

13. The combination of claim 1 wherein said second panel member has a reflective inner surface.

* * * * *